Patented Jan. 22, 1935

1,988,873

UNITED STATES PATENT OFFICE 1,988,873

THERMAL TREATMENT OF HYDROCARBONS

Eduard Linckh and Hans Haeuber, Ludwigshafen-on-the-Rhine, Germany, assignors to I. G. Farbenindustrie Aktiengesellschaft, Frankfort-on-the-Main, Germany No Drawing. Application June 23, 1931, Serial No. 546,430. In Germany July 2, 1930

3 Claims. (Cl. 260—168).

The present invention relates to improvements in the thermal treatment of organic substances.

In the conversion of many hydrocarbons by the action of heat at temperatures ranging about between 350° and 1600° C., as for example in the cracking of oil vapors, in the polymerization of gaseous olefines or cracking gases into benzene, in the conversion of methane and its homologues into benzene hydrocarbons or into olefines, or in the reduction of phenol, cresol and the like in the presence of hydrogen or other reducing gases, it is frequently necessary to employ very highly refractory materials for the construction of the reaction vessels for carrying these processes out on an industrial scale. The gases to be treated are led through glowing tubes, retorts or chambers or through periodically heated regenerators, as for example the so-called Cowper apparatus. Ceramic masses, such as chamotte, silica bricks, carbon bricks, porcelain bricks and the like are mainly used as the refractory constructional materials or heat regenerating filling materials. All these materials have the great drawback that at red heat and higher temperatures they very readily cause a deposition of carbon in the conversion by the mere action of heat and in the absence of other converting agents, such as steam or gases comprising free oxygen, by reason of which deposition the operation must be frequently interrupted and the apparatus cleaned out.

We have now found that the said deposition of carbon is avoided in the thermal treatments of hydrocarbon products by providing those parts of the surface of the refractory material which come into contact with the hot organic materials wholly or partially with a precipitate of oxides of chromium, the latter preferably being burnt in. For example chamotte tubes or chamotte bricks or porous porcelain tubes are impregnated with a concentrated solution of chromic acid or such chromium salts or salts of chromic acid as are decomposed to form oxides at an elevated temperature, the decomposition of the same into oxides of chromium being effected by drying and heating. In this heating treatment the temperature may be raised up to about 1600° C. Extremely finely divided chromium oxide is thus precipitated within the pores and on the surface of the constructional materials and prevents the deposition of carbon in the subsequent chemical process, as for example the cracking of oils. The impregnation of the bricks may be advantageously carried out in vacuo. The protection of the surfaces may also be carried out in other ways, as for example by brushing with a paste of chromium oxide and a binding agent. Chromium oxide may also be added to the materials in the preparation of the constructional materials. Other substances, such as compounds of tungsten, vanadium and uranium may be employed as well as the chromium oxide. Similarly, materials which promote the reaction, as for example catalysts, may also be employed.

The following examples will further illustrate the nature of this invention, but the invention is not restricted to these examples.

Example 1

An internally unglazed porcelain tube is completely filled with a 50 per cent aqueous solution of chromic acid and after some hours the excess of the solution is shaken out. The tube is dried at 400° C. The impregnating and drying processes are repeated three times. The inner side and the pores of the tube are thus provided with a firmly adhering coating of chromium oxide.

Methane is led at from 1075° to 1100° C. through the said tube and a part of the methane is converted into benzene hydrocarbons and hydrogen. Even after use for long periods of time no deposition of carbon on the walls takes place. Under the same conditions a non-pretreated porcelain tube causes a marked deposition of scaly carbon, especially lustrous carbon, after about 2 hours.

Example 2

A tube constructed of fire-clay, 30 millimetres in internal diameter and 3 metres in length, is impregnated with a 50 per cent solution of chromic acid and then subjected to heating. From 1 to 2 cubic metres of methane are passed at a temperature of from 1100° to 1200° C. through the tube thus prepared, whereby about 10 per cent by weight of the methane are converted into benzene hydrocarbons and hydrogen. Even after working for 4 weeks without interruption the tube is not clogged up with carbon, whereas tubes not pretreated in the manner specified are clogged up by deposition of carbon after working for from 1 to 2 hours.

Example 3

A porcelain tube not glazed internally having an internal diameter of 20 millimetres is impregnated with a 50 per cent solution of chromic acid. 30 grams of vaporized paraffin oil boiling from 330° to 380° C. are led into the said tube which is brought into an inclined position and heated to from 650° to 700° C. for a length of 60 centimetres. 41 per cent of oils and 59 per cent of gases are thus obtained, 60 per cent of the oils boiling up to 200° C. and 16 per cent boiling between 200° and 300° C. The oil gas obtained has the following composition, the parts being by volume: 40 per cent of olefines (mainly ethylene, propylene and some butadiene), 0.4 per cent of carbon monoxide, 10 per cent of hydrogen, 48 per cent of methane and homologues thereof and 1.6 per cent of nitrogen. Even after working for a long period of time no deposition of carbon could be observed.

Example 4

10 litres per hour of ethylene are passed through a tube 15 millimetres in internal diameter which has been impregnated in the same manner as described in Example 3 and which is heated to form 700° to 750° C. for a length of 50 centimetres. 15 per cent of the initial ethylene are thus converted into a polymerization product containing about 50 per cent of benzene and 50 per cent of higher aromatic hydrocarbons. The tube is not clogged up by deposition of carbon even after a long period of working. The remaining gas contains on an average 39 per cent of ethylene, 21 per cent of hydrogen, 38 per cent of methane and homologues thereof and 2 per cent of nitrogen.

What we claim is:—

1. In the chemical conversion of a hydrocarbon by the action of heat in the absence of other converting agents comprising steam and gases containing free oxygen, the step which comprises heating said hydrocarbon in a space confined by an oxide of a metal selected from the group consisting of chromium, tungsten, vanadium and uranium.

2. In the chemical conversion of a hydrocarbon by the action of heat in the absence of other converting agents comprising steam and gases containing free oxygen, the step which comprises heating said hydrocarbon in a space confined by a refractory material provided with a lining of an oxide of a metal selected from the group consisting of chromium, tungsten, vanadium and uranium.

3. In the chemical conversion of a hydrocarbon by the action of heat in the absence of other converting agents comprising steam and gases containing free oxygen, the step which comprises heating said hydrocarbon in a space confined by a refractory material which has been impregnated with an aqueous solution of such salt of a metal selected from the group consisting of chromium, tungsten, vanadium and uranium, as is decomposed at an elevated temperature below 1000° C. to form an oxide of the said metal, and then dried and heated to such elevated temperature.

EDUARD LINCKH.
HANS HAEUBER.